F. T. TAYLOR.
CONVEYING MECHANISM.
APPLICATION FILED MAR. 17, 1919.
1,434,859.
Patented Nov. 7, 1922.
4 SHEETS—SHEET 1.
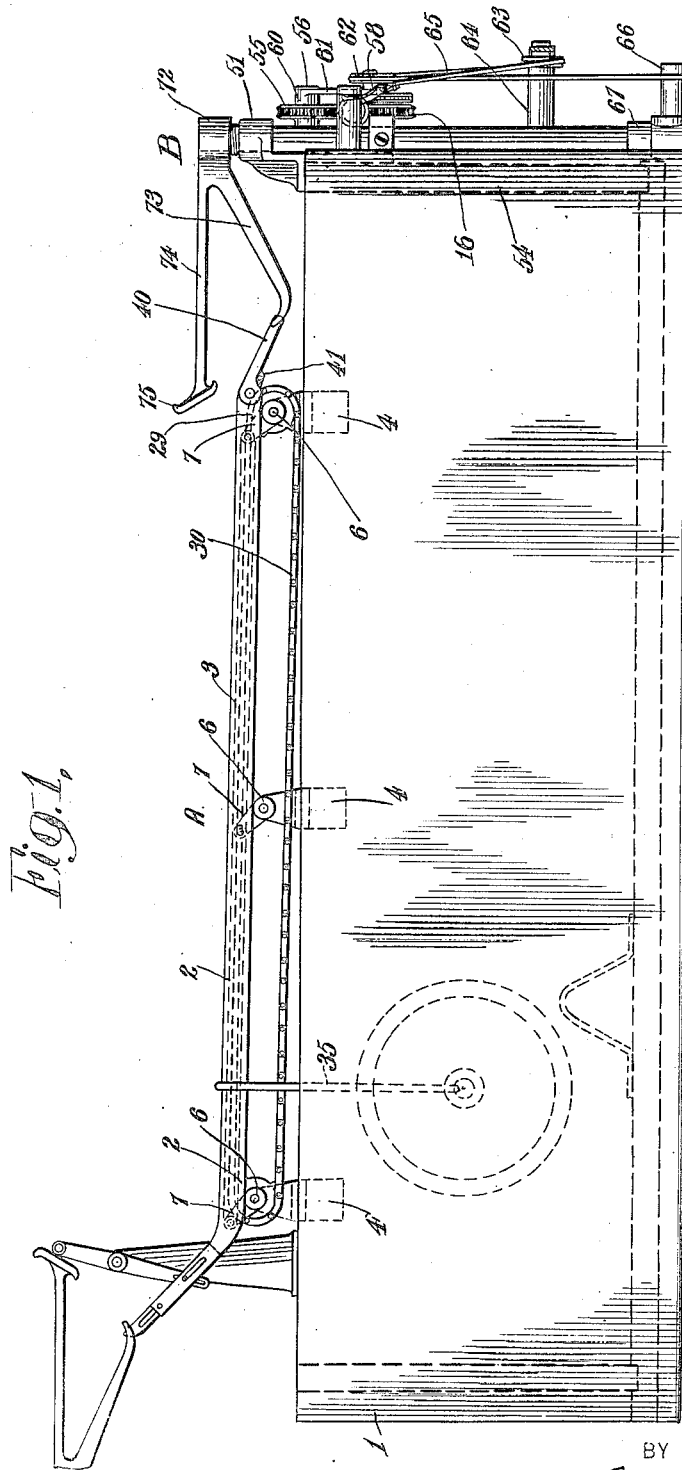
INVENTOR
FLOYD T. TAYLOR
BY
Edwin B. H. Tower Jr.
ATTORNEY

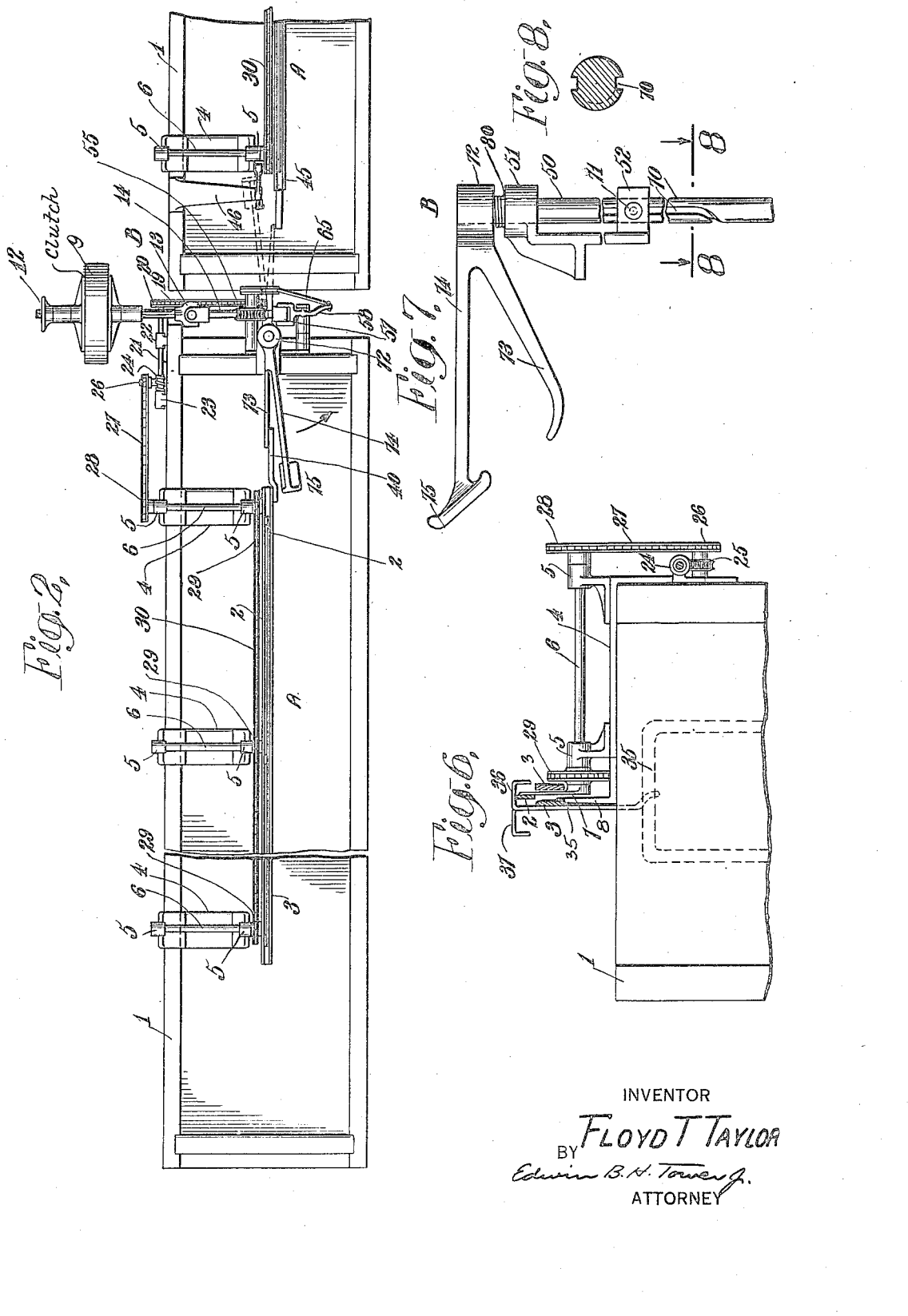

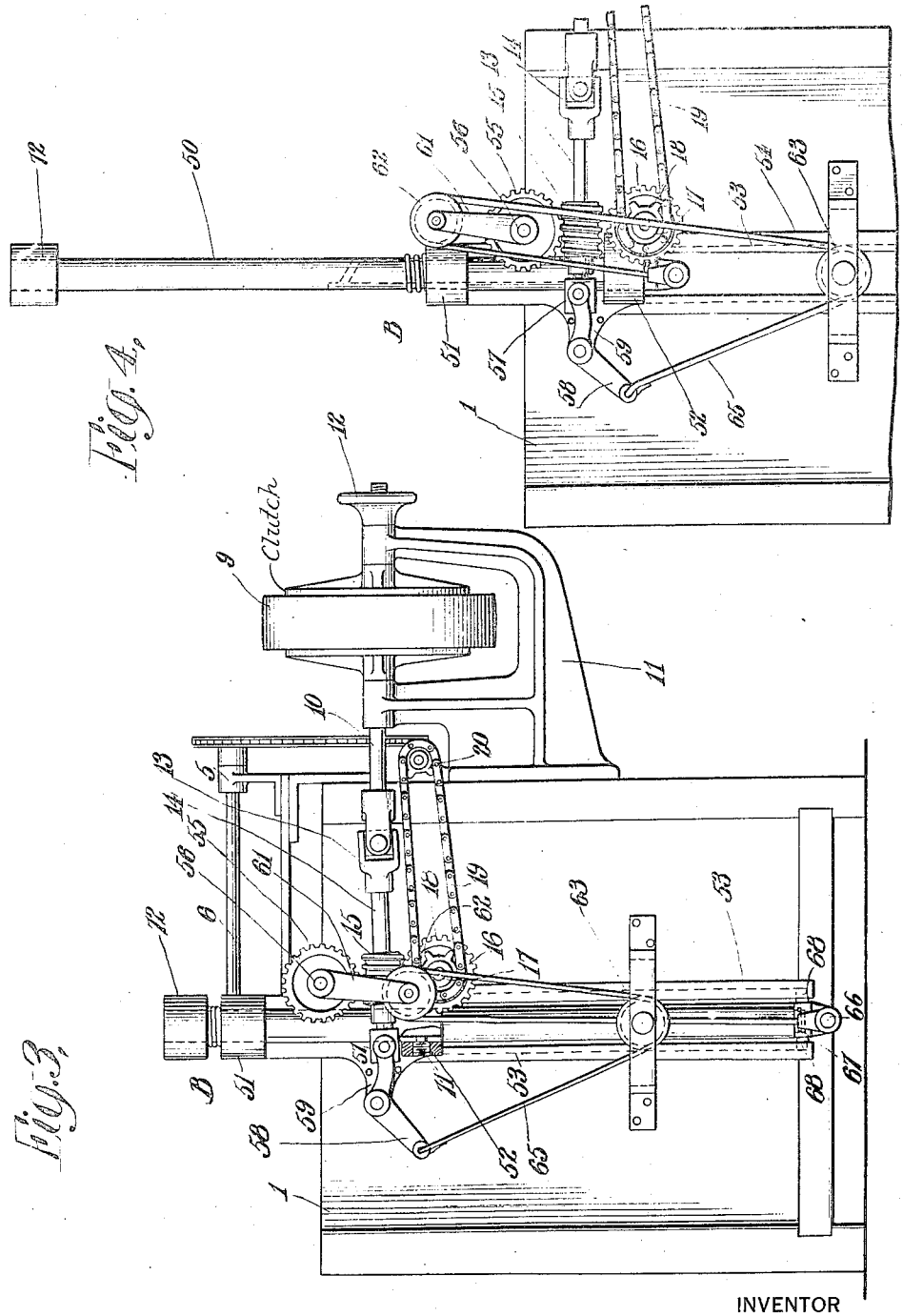

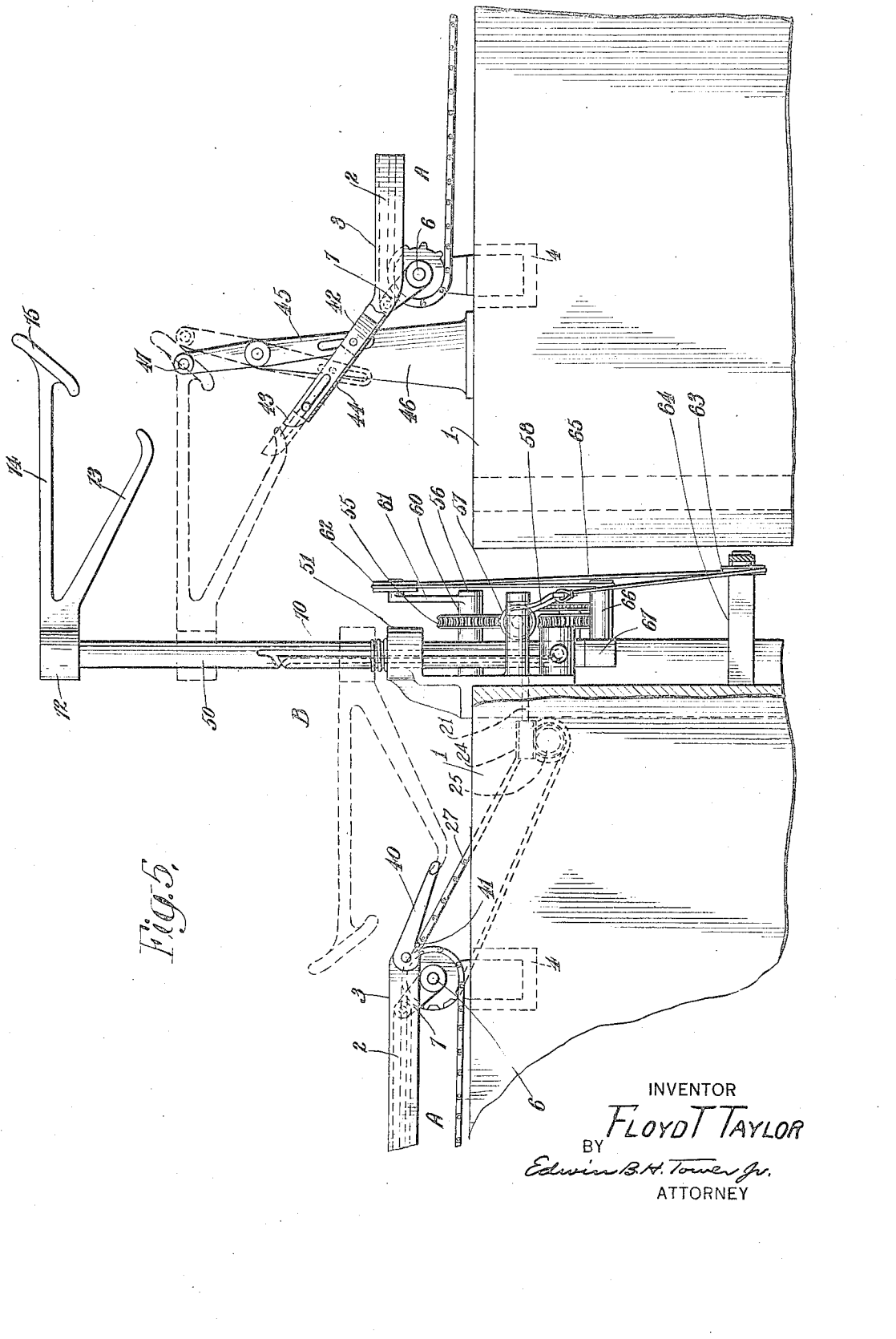

Patented Nov. 7, 1922.

1,434,859

UNITED STATES PATENT OFFICE.

FLOYD T. TAYLOR, OF MATAWAN, NEW JERSEY, ASSIGNOR TO A. P. MUNNING & CO., OF NEWARK, NEW JERSEY, A CORPORATION OF NEW JERSEY.

CONVEYING MECHANISM.

Application filed March 17, 1919. Serial No. 283,054.

*To all whom it may concern:*

Be it known that I, FLOYD T. TAYLOR, a citizen of the United States, residing at Matawan, in the county of Monmouth and State of New Jersey, have invented new and useful Improvements in Conveying Mechanism, of which the following is a specification.

This invention relates to conveying mechanism.

It relates, more particularly, to conveying mechanism adapted to transport material through a plurality of receptacles for different treatments, although it may be advantageously employed in various other fields.

In subjecting material to treatments by liquids, gases, vapors, etc., better results are often attained, and in some instances successful treatment is only obtained, if the material or treating ingredients are vigorously agitated. Agitation tends to bring ingredients in contact with the material being treated, maintains the ingredients in a more uniform condition, and removes bubbles or films of air or other inactive gases which tend to collect upon the surface of the material, and thus facilitates the action and produces a more uniform product. It is also advantageous in many industries, particularly where quantities of material must be subjected to several successive treatments, to automatically carry the material forward during the progress of the various treatments. With some treatments it may also be desirable to have intervals wherein the material and the treating ingredients are relatively at rest.

One of the objects of this invention is to provide improved mechanism for causing agitation of the ingredients or the material during treatment.

Another object is to provide improved conveying mechanism for passing the material through a treatment and producing increased agitation.

Another object is to provide conveying mechanism whereby the material is advanced with intervals wherein the material and treating ingredients are relatively at rest.

Another object is to provide mechanism for intermittently advancing material through successive treatments.

Other objects and advantages of the invention will appear from the following description and claims.

In the accompanying drawings one embodiment of the invention is shown adapted to automatically convey material through a series of receptacles such as tanks or vats. The material is intermittently advanced through each receptacle by an independent conveyor section whose movements produce considerable agitation of the treatment ingredients and provide intervals of rest and movement for the material. The material is then delivered to transfer mechanism whereby it is moved from one conveyor section to another. This transfer from section to section may be accomplished either under automatic or manual control as desired.

In the drawings:

Fig. 1 is a side elevation of a conveyor section for intermittently advancing the material through a treatment, and transfer mechanism for moving the material from one section to another.

Fig. 2 is a plan of the conveying mechanism showing an arrangement for transporting material through two tanks or vats in longitudinal alignment.

Fig. 3 is an enlarged end elevation of the transfer mechanism for carrying the material from tank to tank, the lifting apparatus being shown in its normal position.

Fig. 4 is an enlarged end elevation of the transfer mechanism, the lifting apparatus being shown in its elevated position.

Fig. 5 is an enlarged side elevation of a part of the conveying mechanism arranged for two tanks in longitudinal alignment, the elevating mechanism being shown in both a depressed and an elevated position.

Fig. 6 is an enlarged end view, partly in section, of a conveyor section for transporting the material intermittently through a tank.

Fig. 7 is a detail of the transfer mechanism.

Fig. 8 is a sectional view on line 8—8 of Fig. 7.

The conveying mechanism comprises, in general, one or more conveyor sections A for transporting the material intermittently or step-by-step through the various treatment receptacles or tanks and transfer mechanism B for transferring the material from one conveyor section to another.

*The conveyor sections.*—The conveyor sections for intermittently transporting the material to be treated through the various receptacles will first be described.

Each conveyor section for carrying the material intermittently through a treatment is shown mounted upon a receptacle 1, which for the purpose of illustration is in the form of a tank or vat. The material travels through the tank or vat from one end to the other by a succession of up and down and forward movements separated by intervals of rest. These movements agitate the treating ingredients and the material undergoing treatment and tend to remove bubbles or films of inactive agents, such as air, from the material. The intervals of rest provide periods wherein there is little or no relative movement between the treating ingredients and the material, which may be advantageous in some processes.

The material is carried forward by a reciprocating carrier or connecting rod 2 and is supported during the intervals of rest by a track 3. Both the connecting rod and the track are supported by the tank through suitable brackets 4. Each bracket has a pair of bearings 5 within which are journaled shafts 6. The inner ends of shafts 6 carry cranks 7, to which the connecting rod 2 is pivotally connected. Track 3 comprises a pair of parallel rails supported by extensions 8 of brackets 4 and spaced apart to allow the connecting rod and cranks to pass therebetween. The lengths of the cranks and the vertical position of the track are such that during a portion of the upper arcs of the movement of the cranks the connecting rod passes above the upper edges of track.

Movement is imparted to the cranks and connecting rod from any suitable source of power through a friction belt pulley 9. Pulley 9 is carried by a shaft 10 journaled in a bracket 11, mounted on the side of the tank. It is also provided with a suitable clutch, which is controlled by a hand nut 12, so that the pulley and its shaft may be drivingly connected or disconnected at will. The end of shaft 10 carries a universal joint 13, to which is connected a short shaft 14, carrying a worm 15. Worm 15 is adapted to engage and drive a worm wheel 16 carried by a fixed shaft 17. Shaft 17 carries sprocket wheel 18, around which passes a chain 19. Chain 19 drives a sprocket wheel 20, which is mounted on a shaft 21 journaled in brackets 22 and 23 secured to the sides of the tank. Shaft 21 carries a worm 24, which engages and drives a worm wheel 25, whose shaft also supports a sprocket wheel 26. A chain 27 interconnects wheel 26 and a sprocket wheel 28 which is carried by one of the crank-shafts 6. Some of the crank-shafts 6 may be provided, if desired, with sprocket wheels 29, over which passes a chain 30. With such an arrangement, the various cranks may be positively driven from the source of power, relieving the connecting rod of this load. With short tanks, the connecting rod may usually be depended upon, and the interconnecting chain and sprocket wheels may be dispensed with. But with very long tanks and connecting rods, the positive drive may be found more satisfactory.

The material to be treated may be carried by suitable racks 35, each of which is provided with a hanger having oppositely-disposed suspension hooks 36 and 37. One of these hooks extends over the top of track 3, as most clearly shown in Figure 6. The other hook is adapted to be engaged by the transfer mechanism when the material is to be transferred from one conveyor section to another. One hook only may be used, but two hooks, one for suspension on the track and connecting rod and one for cooperation with the transfer mechanism, are preferred, as there is less likelihood of conflict and uncertainty of operation.

When the connecting rod is driven, through the agency of the mechanism hereinbefore described, it passes upwardly between the rails of track 3 and, engaging one of the rack suspending hooks, raises and advances and lowers the material. The material then remains at rest, suspended from the track, while the cranks and connecting rod are completing their arcs of movement which are below the track. As the connecting rod again passes above the level of the track, the racks are lifted therefrom, advanced and again lowered. Thus the material passes over a conveyor section by a series of up-and-down and forward movements separated by periods of no movement. The amount of the up-and-down and forward movements of the material is dependent upon the distance the connecting rod rises above the level of the track, and may be varied to suit different conditions.

To facilitate the delivery of the racks of material from a conveyor section to a transfer mechanism, the rear or leaving end of track 3 is provided with a pivoted track extension 40. Extension 40 normally rests with its free end depressed, the downward movement being limited by a stop 41. The extension may, however, be turned slightly about its pivot, when the racks of material are being removed therefrom, to insure that the rack hooks are readily disengaged from the track. The delivery of the material from the transfer mechanism to a conveyor section is assisted by providing the receiving end of track 3 with an upwardly-extending track extension 42. The outer end of extension 42 is provided with an extensible track section 43, which is connected by a pin-and-slot connection 44 to a lever 45. Lever 45 is pivoted intermediate its ends to a suitable bracket 46 mounted on the tank, and is provided at its upper end with a roller 47. Roller 47 is adapted to be engaged by a part of the transfer mechanism to project the extension 43 into the path of one of the material rack hooks, as will be hereinafter described.

*The transfer mechanism.*—The transfer mechanism B, whereby the material is moved from one conveyor section to another, will next be described. This transfer mechanism is, in general, the same as that disclosed in my Patent No. 1,382,144 granted June 21, 1921.

Each transfer mechanism comprises an elevating and lowering plunger 50, which is slidably and rotatably braced in collars 51 and 52 and a guideway 53. The collars and guideway form part of a bracket 54 mounted upon tank 1. It is not necessary, however, that the transfer mechanism be mounted upon a tank, since it may be independently supported by a suitable pedestal resting on the floor.

Plunger 50 may, as shown, be operated from the same source of power that drives the connecting rod 2. The universal joint 13 allows shaft 14 to be moved, so that its free end is sufficiently elevated to cause worm 15 to engage a gear wheel 55 mounted on a fixed shaft 56. Shaft 56 is journaled in bearings carried by bracket 54. To elevate worm 15, the end of shaft 14 is supported by a pivoted end-bearing 57, carried by a bell-crank lever 58. Bell-crank lever 58 is pivoted to an extending lug 59 of bracket 54. Gear wheel 55 has a collar 60 provided with an arm 61, upon which is journaled a belt pulley 62. A relatively stationary belt pulley 63 is journaled to an extension 64 of bracket 54. A belt 65 has one end anchored to the outer end of lever 58, passes over pulleys 62 and 63, and has its other end fastened to a projection 66 of a plunger support 67. The lower end of plunger 50 rests in a suitable socket in support 67 and in which the plunger is free to rotate. Support 67 has a pair of guide keys 68, which travel in grooves of guideway 54 to prevent the support from rotating.

It will be readily understood that, when gear wheel 55 is driven by worm 15, arm 61 and belt pulley 62 will be rotated. The first half of the revolution of pulley 62 about shaft 56 will, because one end of belt 65 is anchored to lever 58 and the other end is attached to the movable plunger support 67, raise plunger 50 a distance approximately equal to the diameter of the circle circumscribed by the outer belt surface of pulley 62. The second half revolution of pulley 62 allows belt 65 to slacken and plunger 50 to return. The end of the belt fastened to lever 58 has only a very limited movement, because, when worm 15 and gear wheel 55 become engaged, further rotation of lever 58 is prevented.

To cause the plunger to be turned to move the racks of material, after they have been raised to clear the tank walls, a double groove 70, having an interconnecting spiral at each end, is cut in the surface of the plunger. Into groove 70 a fixed key 71, carried by collar 52, extends. During the rotation of arm 61 and pulley 62, the plunger merely rises and falls as long as key 71 engages a portion of groove 70 which is straight and longitudinal of the plunger. When, however, a spiraled portion of the groove comes into engagement with the key, the plunger is also given a rotary movement. Thus, in the illustration shown, where the tanks are in longitudinal alignment, the two straight portions of groove 70 are 180 degrees apart, being interconnected near the top and bottom by suitable spiraled sections. The construction and function of this plunger groove is more fully explained in the patent hereinbefore mentioned.

Assuming that plunger 50 is in depressed position as shown in Figure 3, the first or assembling half of a complete revolution of arm 61 and pulley 62 will first cause the plunger to be elevated and then given a combined elevating and turning movement in an anti-clockwise direction until it has been turned 180 degrees and assumes the position shown by the full lines of Figure 5. During the second or descending half revolution of arm 61 and pulley 62, the plunger first sinks in its turned position and, when the upper spiraled portion of groove 70 reaches key 71, is both depressed and turned in a clockwise direction 180 degrees back to its initial position, where the transfer mechanism is stopped, as will be presently explained.

Plunger 50 is provided at its top with a collar 72, carrying an arm 73 for picking up the racks of material by their hooks and moving them from one conveyor section to another. Collar 72 is also provided with an arm 74, which has a shoe 75, adapted, when plunger 50 has moved downward a predetermined distance in its turned position, to engage the roller 47 of lever 45. This engagement tilts lever 45 and causes it to move the track extension 43 outwardly, as shown by the dotted lines of Figure 5. In this position, extension 43 is in the path of that rack hook which is hanging on transfer arm 73 and the rack is removed from the transfer mechanism and moves down the inclined portion of track 3 of the next conveyor section by the force of gravity.

The transfer mechanism may be made either wholly or partly automatic in its action. If it is to be wholly automatic, the material is utilized to initiate the movements of the plunger. A counter-balance device, which may be adjustable, is associated with the plunger to relieve the tension in belt 65 at the proper time to effect the disengagement of worm 15 and gear 55. In the embodiment illustrated, this counter-balance device is a coiled spring 80 placed around plunger 50 between collars 51 and 72. This spring is of such a height and strength that when plunger 50 descends collar 72 thereon engages the spring and the descent is arrested just before pulley 62 reaches the position where it can exert the minimum tension in belt 65. The continuation of the rotation of pulley 62 slackens belt 65, and the weight of shaft 14 and worm 15 causes the outer end of the shaft to fall until it is arrested by worm 15 re-engaging gear 16. The power is thus removed from the transfer mechanism and re-applied to the conveyor section. When, however, the next rack of material is delivered to arm 73, the added weight depresses plunger 50 against the tension of spring 80. This movement of the plunger is sufficient to tension belt 65 and rock lever 58 to cause the re-engagement of worm 15 and gear 55. Arm 61 and pulley 62 thereupon begin to rotate to elevate the plunger and thereafter sufficient tension is maintained in belt 65 to keep worm 15 and gear 55 in mesh until a cycle has been completed and the descent of the plunger is again arrested by spring 80. During the rotation of arm 61 and pulley 62, the movement of the conveyor section is, of course, stopped, since worm 15 and gear 16 are at such times disengaged. Thus, a conveyor section is stopped when the corresponding transfer mechanism is in operation and no material will be delivered to a transfer mechanism unless the arm thereof is in position to receive it.

The weight of the material need not be depended upon to effect the necessary compression of spring 80 and the plunger to initiate the operation of the transfer mechanism, since the racks may be made heavy enough to accomplish this without additional weight. The operation of a conveyor section and corresponding transfer mechanism is thus synchronized so that no material is delivered for transfer until a transfer arm is in position to receive it.

The operation of the transfer mechanism may be made semi-automatic by dispensing with spring 80 and so relating collars 51 and 72 that the plunger is positively stopped by their engagement just before pulley 62 reaches the position where it produces minimum tension in belt 65. When so arranged, the arrival of a rack of material to transfer arm 73 will not start the transfer mechanism in operation. This may be accomplished by manually rocking lever 58 to cause the engagement of worm 15 and gear 55, whereupon the cycle of operations will be completed as previously described.

*Summary of operation.*—The various operations of the conveying mechanism may be summarized as follows:

The material is delivered to a conveyor section at its forward or receiving end. The reciprocation of connecting rod 2 intermittently advances the material through a treatment by a series of up-and-down and forward movements separated by intervals of rest while the rod is below the level of track 3. The material finally reaches track extension 40 at the delivery end, where it passes down upon the arm 73 of the transfer mechanism.

The additional weight depresses plunger 50 against the force of spring 80 to tension belt 65, which rocks lever 58. This causes the disengagement of worm 15 and gear 16, to stop the conveyor section, and the engagement of worm 15 and gear 55, to initiate the rotation of arm 61 and pulley 62. The rotation of pulley 62 first elevates plunger 50 to raise the material from the tank. When the lower spiraled portion of the plunger reaches key 71, the plunger is given a combined upward and anti-clockwise rotary movement through 180 degrees until the rack of material is positioned over the next conveyor section. Pulley 62 now begins the descending half of its arc of movement, and the plunger sinks by the force of gravity. When the plunger has been lowered part way, shoe 75 of arm 74 engages roller 47 and rocks lever 45 to project track extension 43 into the path of one of the material rack hooks. The material is thus removed from the transfer arm and passes to the next conveyor section. The downward movement of the plunger continues until the upper spiraled portion of groove 70 reaches key 71, whereupon the plunger is given a combined downward and clockwise rotary movement through 180 degrees, back to initial position. The spring 80 relieves the tension from belt 65, which allows worm 15 to become disengaged from gear 55, stopping the transfer mechanism until the arrival of a new rack of material starts the cycle again. The worm 15 and gear 16 also come into mesh so that the conveyor section starts operation.

The various conveyor sections may be disposed in any desired relative positions and the proper transfer of the material effected by the spiraling of the grooves in the elevating plungers. Thus, as in the embodiment shown, when the sections are arranged in longitudinal alignment, the spiraling is around half the circumference. If the sections are to be arranged at right angles, the two vertical portions of the plunger groove will be 90 degrees apart and the interconnecting spirals cut around a quarter of the circumference. Thus, the various conveyor sections and tanks may be arranged to suit any desired or necessary space conditions or directions of travel of the material.

The conveyor sections and transfer mechanisms are all independent as far as rapidity of motion is concerned, so that the material undergoing treatment may be passed rapidly through some tanks and slowly through others and the transfer from tank to tank may be timed as desired. The operation of an entire installation may be synchronized, as pointed out in the previously-mentioned patent.

If any of the treatments require the presence of an electric current the track may be connected to one terminal of the source of current. The material, when it is suspended from the track, then becomes one immersed active electrode. The other electrode may be suitably placed in the tank. The current through any rack of material may thus be intermittently applied by causing the circuit to be broken when a rack is lifted from the track and to be completed when a rack is suspended therefrom.

While only one embodiment of the invention has been chosen for the purpose of illustration, many changes therein may be made without departing from the spirit thereof.

What I claim is:

1. A conveying mechanism having a track, means for engaging the track and depending therefrom so as to support below the track the material to be transported, mechanism for intermittently advancing the material along the track, and means for operating said material advancing mechanism.

2. A conveying mechanism having a track for supporting material to be transported, means for engaging the track and supporting the material below the track, a plurality of spaced rotatable shafts, each having a crank fixed thereto, a connecting rod for intermittently advancing the material along the track and pivotally connected to the free ends of the cranks so as to be supported adjacent the track in parallel relation thereto, and means for rotating the shafts so as to intermittently raise the connecting rod above the track, and while it is so raised to move the rod forward with respect to the track.

3. In a conveying mechanism, the combination of a plurality of intermittent conveyors each adapted to raise material from its support and to transport the same by a succession of intermittent movements, and independent means for transferring the material from one conveyor to another.

4. In a conveying mechanism, the combination of a plurality of independent conveyors each adapted to transport material by a succession of intermittent forward and up-and-down movements after the material is raised from its support and independent means for transferring the material from one conveyor to another.

5. A conveying mechanism comprising a track having a pair of spaced stationary rails, means for engaging the track rails and depending therefrom so as to support below the track the material to be transported, a plurality of spaced rotatable shafts each having a crank fixed thereto, a connecting rod for intermittently advancing the material along the track, said connecting rod being located between the rails and in parallel relation thereto and pivotally connected to the free ends of the cranks, and means for rotating the shafts so as to intermittently raise the connecting rod above the track and while so raised to advance the same forward with respect to the track.

6. A conveying mechanism having a track, a hanger having means at one end for engaging the track and supporting below the track material to be transported, a plurality of spaced rotatable shafts, each having a crank fixed thereto, a connecting rod for intermittently engaging the hanger so as to advance the material along the track, said connecting rod being pivotally connected to the free ends of the cranks so as to be supported adjacent the track in parallel relation thereto, and means for rotating the shafts so as to intermittently raise the connecting rod above the track.

7. A conveying mechanism comprising a plurality of tracks for supporting the material to be transported, a plurality of connecting rods each adapted to advance the material along one of said tracks intermittently, and transfer mechanism for removing the material from one track and delivering it to another track.

8. A conveying mechanism having a track, a hanger for engaging the track and depending therefrom so as to support below the track the material to be transported, a connecting rod for intermittently advancing the material along the track, and means including a rotatable shaft for operating the connecting rod.

In witness whereof, I have hereunto subscribed my name.

FLOYD T. TAYLOR.